US009684412B2

(12) United States Patent
Xia et al.

(10) Patent No.: US 9,684,412 B2
(45) Date of Patent: Jun. 20, 2017

(54) METHOD AND APPARATUS FOR GENERATING A THREE-DIMENSIONAL USER INTERFACE

(71) Applicant: SPREADTRUM COMMUNICATIONS (SHANGHAI) CO., LTD, Pudong New Area, Shanghai (CN)

(72) Inventors: Lu Xia, Shanghai (CN); Haipeng Liu, Shanghai (CN)

(73) Assignee: Speadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/118,061

(22) PCT Filed: May 30, 2013

(86) PCT No.: PCT/CN2013/076459
§ 371 (c)(1),
(2) Date: Nov. 15, 2013

(87) PCT Pub. No.: WO2013/189235
PCT Pub. Date: Dec. 27, 2013

(65) Prior Publication Data
US 2016/0041641 A1    Feb. 11, 2016

(30) Foreign Application Priority Data

Apr. 26, 2013  (CN) .......................... 2013 1 0151506

(51) Int. Cl.
*G06F 3/042*     (2006.01)
*G06F 3/0488*    (2013.01)
*G06F 3/0481*    (2013.01)
*G06T 15/00*     (2011.01)

(52) U.S. Cl.
CPC ............ *G06F 3/042* (2013.01); *G06F 3/0488* (2013.01); *G06F 3/04815* (2013.01); *G06T 15/005* (2013.01)

(58) Field of Classification Search
CPC ................................................. G06F 3/04815
USPC ........................................................ 345/173
See application file for complete search history.

(56) References Cited

U.S. PATENT DOCUMENTS

| 5,880,733 | A | * | 3/1999 | Horvitz | G06F 3/04815 345/427 |
| 2001/0028369 | A1 | * | 10/2001 | Gallo | G06F 3/04815 715/848 |
| 2002/0175911 | A1 | * | 11/2002 | Light | G06T 17/00 345/419 |
| 2007/0164989 | A1 | * | 7/2007 | Rochford | G06F 3/0482 345/156 |

(Continued)

*Primary Examiner* — Viet Pham
(74) *Attorney, Agent, or Firm* — Finnegan, Henderson, Farabow, Garrett & Dunner, LLP

(57) ABSTRACT

A method for providing a three-dimensional user interface includes generating an image of a three-dimensional scene according to a set of camera parameters. The three-dimensional scene includes a plurality of three-dimensional graphical elements. The three-dimensional graphical elements are associated with a plurality of applications stored on a computing device. The method further includes receiving a user input; adjusting the camera parameters according to the user input; and updating the image of the three-dimensional scene according to the adjusted camera parameters.

12 Claims, 6 Drawing Sheets

(56) References Cited

U.S. PATENT DOCUMENTS

2010/0333017 A1* 12/2010 Ortiz .................. G06F 3/0486
715/800
2011/0164029 A1* 7/2011 King .................. G06F 3/04883
345/419
2013/0127850 A1* 5/2013 Bindon .................. G06T 19/20
345/420

* cited by examiner

METHOD AND APPARATUS FOR GENERATING A THREE-DIMENSIONAL USER INTERFACE

FIELD OF THE DISCLOSURE

This disclosure relates to human-computer interfaces in general and to method and apparatus for generating a three-dimensional user interface in particular.

BACKGROUND OF THE DISCLOSURE

Human-computer interfaces provide important means for users to interact with a wide range of computing devices, such as desktop computers, laptop computers, tablet computers, smart phones, etc. Existing human-computer interfaces may include user input devices, such as a mouse, keyboard, or touch screen, which receive user inputs. For example, a conventional computing device including a touch screen may generate a two-dimensional user interface. The two-dimensional user interface allows a user to interact with the computing device through graphical elements displayed thereon.

The conventional two-dimensional user interface, however, presents the graphical elements only in a predetermined two-dimensional array, which limits the number of elements that may be presented to the user. Arrangements and movements of the graphical elements are often restricted. Moreover, application icons in the conventional two-dimensional user interface are often presented out of context as standalone graphical elements. As a result, the conventional two-dimensional user interface often becomes difficult for users to comprehend and operate efficiently.

SUMMARY OF THE DISCLOSURE

According to one embodiment, a method for providing a three-dimensional user interface includes generating an image of a three-dimensional scene according to a set of camera parameters. The three-dimensional scene includes a plurality of three-dimensional graphical elements. The three-dimensional graphical elements are associated with a plurality of applications stored on a computing device. The method further includes receiving a user input; adjusting the camera parameters according to the user input; and updating the image of the three-dimensional scene according to the adjusted camera parameters.

According to another embodiment, an apparatus for providing a three-dimensional user interface includes an input module for receiving a user input; an output module for displaying an image of a three-dimensional scene; a storage module for storing computer-executable instructions and a plurality of applications; and a processor for executing the computer-executable instructions. The computer-executable instructions cause the processor to generate the image of the three-dimensional scene according to a set of camera parameters. The three-dimensional scene includes a plurality of three-dimensional graphical elements, the three-dimensional graphical elements being associated with the applications stored in the storage medium. The computer-executable instructions further cause the processor to adjust the camera parameters according to the user input and update the image of the three-dimensional scene according to the adjusted camera parameters.

According to still another embodiment, a computer-readable medium includes instructions, which, when executed by a processor, cause the processor to perform a method for providing a three-dimensional user interface. The method includes generating an image of a three-dimensional scene according to a set of camera parameters. The three-dimensional scene includes a plurality of three-dimensional graphical elements, the three-dimensional graphical elements being associated with a plurality of applications stored on a computing device. The method further includes receiving a user input; adjusting the camera parameters according to the user input; and updating the image of the three-dimensional scene according to the adjusted camera parameters.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented or stated. The implementations set forth in the following description of exemplary embodiments do not represent all implementations consistent with the invention. Instead, they are merely examples of systems and methods consistent with aspects related to the invention as recited in the appended claims.

Figure 1:
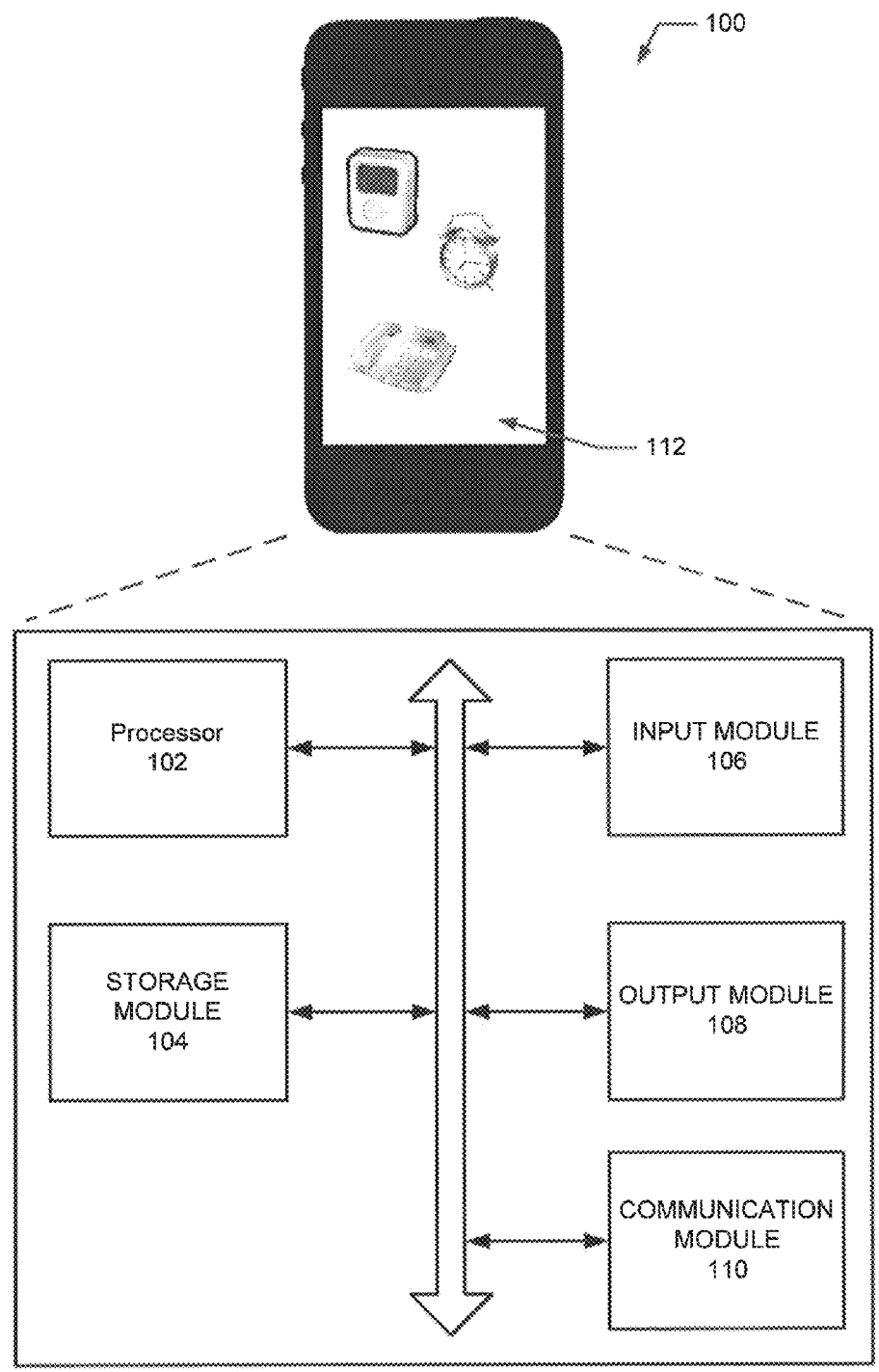
FIG. 1 is a schematic diagram of a computing device according to one embodiment.

FIG. 1 illustrates an exemplary computing device 100 for generating a three-dimensional user interface according to an embodiment. Computing device 100 may be a desktop, laptop, smart phone, tablet, or other computing device known in the art. More particularly, device 100 includes a processor 102, also known as a central processing unit (CPU), a storage module 104, an input module 106, an output module 108, and a communication module 110. Processor 102 may be an INTEL processor, an AMD processor, or any other processing unit known in the art, and configured to process user inputs and execute computer-executable instructions to operate device 100.

Storage module 104 may include a hard drive, a flash drive, an optical drive, a random-access memory (RAM), a read-only memory (ROM), or any other computer-readable medium known in the art. Storage module 104 is configured to store data and the computer-executable instructions relevant to the operation of device 100. Storage module 104 also stores computer-executable instructions associated with a plurality of applications. The applications, when executed by processor 102, cause device 100 to operate as the user desires. The user may select the applications to perform functions including, for example, making telephone calls, playing music or videos, navigating, etc.

Input module 106 may include a keyboard, a keypad, a mouse, a joystick, a button, a thumbwheel, a touch screen, or any other input device, which is configured to receive inputs from a user. In one embodiment, input module 106 includes a touch screen 112, which is configured to detect the user's hand gestures or hand motions when the user's hand contacts touch screen 112 and convert the user's hand gestures or hand motions to electronic signals for controlling the operation of device 100.

Output module 108 may include a display device, a speaker, a vibration generator, or other output device. Output module 108 is configured to provide the user with user feedback including, for example, images, videos, sounds, and vibrations. Output module 108, such as the display device, is coupled to processor 102 to receive signals and generate a graphical user interface including a plurality of graphical elements. The graphical elements may include icons associated with the individual applications stored in storage module 104. When the user selects a graphical element, device 100 executes the application associated with the graphical element and causes the display device to generate graphical interfaces according to the execution of the application.

According to a further embodiment, touch screen 112 is configured to operate as a part of input module 106 as well as output module 108. Touch screen 112 receives user inputs by detecting the hand motions of the user and generates user outputs by presenting the graphical interfaces displayed thereon.

Communication module 110 may be configured to communicate with a telephone network, a wireless cellular network, or a computer network as known in the art. For example, communication module 110 may include a modem configured to provide network communication with a telephone network or a wireless cellular network. Alternatively, communication module 110 may include an Ethernet interface, a Wi-Fi interface, or a Bluetooth interface to provide network communication with an Ethernet, a local area network (LAN), a wide area network (WAN), or any other computer networks.

According to a further embodiment, when the user operates device 100 through touch screen 112 by using, for example, hands or fingers, processor 102 detects a particular motion of the user's hands or fingers according to the electronic signals generated by touch screen 112. For example, based on the electronic signals generated by touch screen 112 in response to such motion, processor 102 detects a sliding motion, a circular motion, or a tapping motion of the user's hands or fingers with respect to touch screen 112. Processor 102 then interprets the detected motions and generates control signals corresponding to the detected motions to control the operation of device 100.

Figure 2:
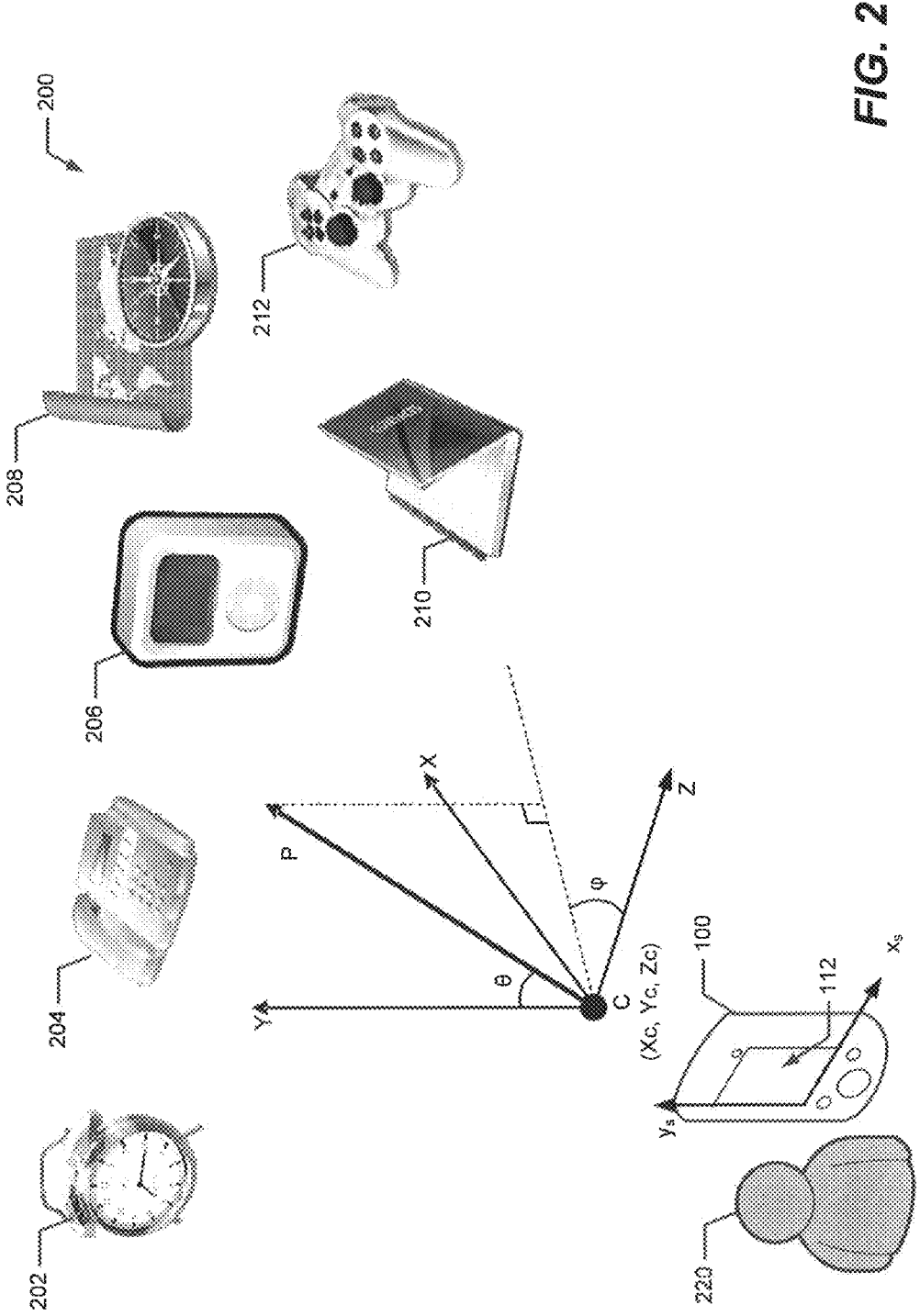
FIG. 2 illustrates a three-dimensional user interface generated by the computing device of FIG. 1.

According to a further aspect of the disclosure, as shown in FIG. 2, processor 102 generates a threedimensional (3D) scene 200 including a plurality of three-dimensional graphical elements 202-212. Graphical elements 202-212 are represented by data stored in storage module 104, which may be retrieved by processor 102 and rendered on touch screen 112. Graphical elements 202-212 are associated with a plurality of applications stored in storage module 104, including, for example, a clock application 202 for providing a time and an alarm function, a phone application 204 for providing a telephone calling function, a music player application 206 for playing music, a map and navigation application 208 for providing direction and navigation functions, an address book application 210 for storing and presenting information of contacts associated with a user 220, and a game application 212 for providing a computer gaming function. User 220 may interact with device 100 through 3D scene 200 rendered on touch screen 112.

According to a further aspect of the disclosure, processor 102 incorporates a theme into 3D scene 200 to facilitate operation of device 100 by user 220. Processor 102 may render an interior of a house, an office, a store, or a park for 3D scene 200. For example, when processor 102 renders an interior of a house including a desk and a shelf, processor 102 may place clock application 202, phone application 204, and address book application 210 on the desk and place music player application 206, navigation application 208, and game application 212 on the shelf. According to another embodiment, processor 102 may incorporate graphical elements 202-212 in a theme that mirrors a physical location, such as a town, a city, a country, or the entire world.

Processor 102 may further arrange graphical elements 202-212 according to preference of user 220. According to one embodiment, for example, processor 102 arranges graphical elements 202-212 according to an arrangement of a physical house of user 220. The theme in combination with 3D scene 200 allows for easy and intuitive interactions between user 220 and device 102 as if user 220 interacts with physical objects.

According to a further embodiment, processor 102 renders 3D scene 200 according to a virtual camera. The virtual camera simulates a point of view for user 220 viewing 3D scene 200 through touch screen 112 and is used by processor 102 to render an image of 3D scene 200 according to the point of view. The virtual camera has a set of parameters that control how 3D scene 200 is shown on touch screen 112. The parameters of the virtual camera may include, for example, a location of a camera center C. The parameters may further include an orientation of the camera center C represented by an orientation vector P.

The location and the orientation of camera center C are defined based on X, Y, and Z axes of a scene coordinate system associated with 3D scene 200. More particularly, the location of the camera center C is represented by coordinates (Xc, Yc, Zc) defined with respect to the scene coordinate system. The orientation vector P of the camera center C is defined by coordinates (r, θ, φ), where r represents a length of the orientation vector P, θ represents an angle formed between the Y axis and the orientation vector P, and φ represents an angle formed between the Z axis and a projection of vector P in the X-Z plane. Alternatively, the orientation vector P is defined by coordinates (X, Y, Z), where X, Y, and Z represent projections of the vector P on the X, Y, and Z axis, respectively. Processor 102 may convert the representation of the orientation vector P between the coordinates (r, θ, φ) and the coordinates (X, Y, Z) according to the following equations:

$$X = r\sin\varphi\sin\theta, \tag{1}$$

$$Y = r\cos\theta, \tag{2}$$

$$Z = r\cos\varphi\sin\theta, \tag{3}$$

$$r = \sqrt{X^2 + Y^2 + Z^2}, \tag{4}$$

$$\theta = \arccos\left(\frac{Y}{\sqrt{X^2 + Y^2 + Z^2}}\right), \tag{5}$$

and

-continued $$\varphi = \arctan\left(\frac{X}{Z}\right) \qquad (6)$$

According to a still further aspect, the length r of the orientation vector P is set to 1 for ease of computation. The length r may, of course, take other values as desired.

During operation of device 100, processor 102 may adjust the parameters of the virtual camera according to inputs received from user 220 through touch screen 112. Processor 102 detects inputs from user 220 based on a screen coordinate system associated with touch screen 112. The screen coordinate system, which is defined herein separately from the above described scene coordinate system, includes an $x_s$ axis and a $y_s$ axis along respective edges of touch screen 112. When user 220 presses, for example, a finger on touch screen 112, touch screen 112 generates a signal and transmits the signal to processor 102. Based on the signal generated by touch screen 112, processor 102 determines a point of contact between the finger and touch screen 112 and screen coordinates ($x_s$, $y_s$) associated with the point of contact. When user 220 moves the finger across touch screen 112, processor 102 determines a motion of the point of contact in response to the motion of the finger. The motion of the point of contact on touch screen 112 is represented by changes of the screen coordinates, $\Delta x_s$ and $\Delta y_s$, of the point of contact. The screen coordinates ($x_s$, $y_s$) and the motion ($\Delta x_s$, $\Delta y_s$) of the point of contact are defined with respect to the screen coordinate system.

According to one embodiment, when user 220 selects one of graphical elements 202-212 by pressing a finger on a graphical element displayed on touch screen 112, processor 102 focuses the rendering of 3D scene 200 on the selected graphical object. More particularly, processor 102 adjusts the parameters of the virtual camera by position the camera center C in front of the selected graphical object and orients the orientation vector P of the camera center C towards the selected graphical object. As a result, processor 102 renders an image of the selected graphical object at the center of touch screen 112 and displays the selected graphical object in a front view. The remainders of 3D scene 200, including the unselected graphical elements, are rendered on touch screen 112 according to their relative positions with respect to the location and the orientation of the camera center C. Processor 102 may render 3D scene 200 according to those techniques known in the art of computer graphics.

Figure 3:
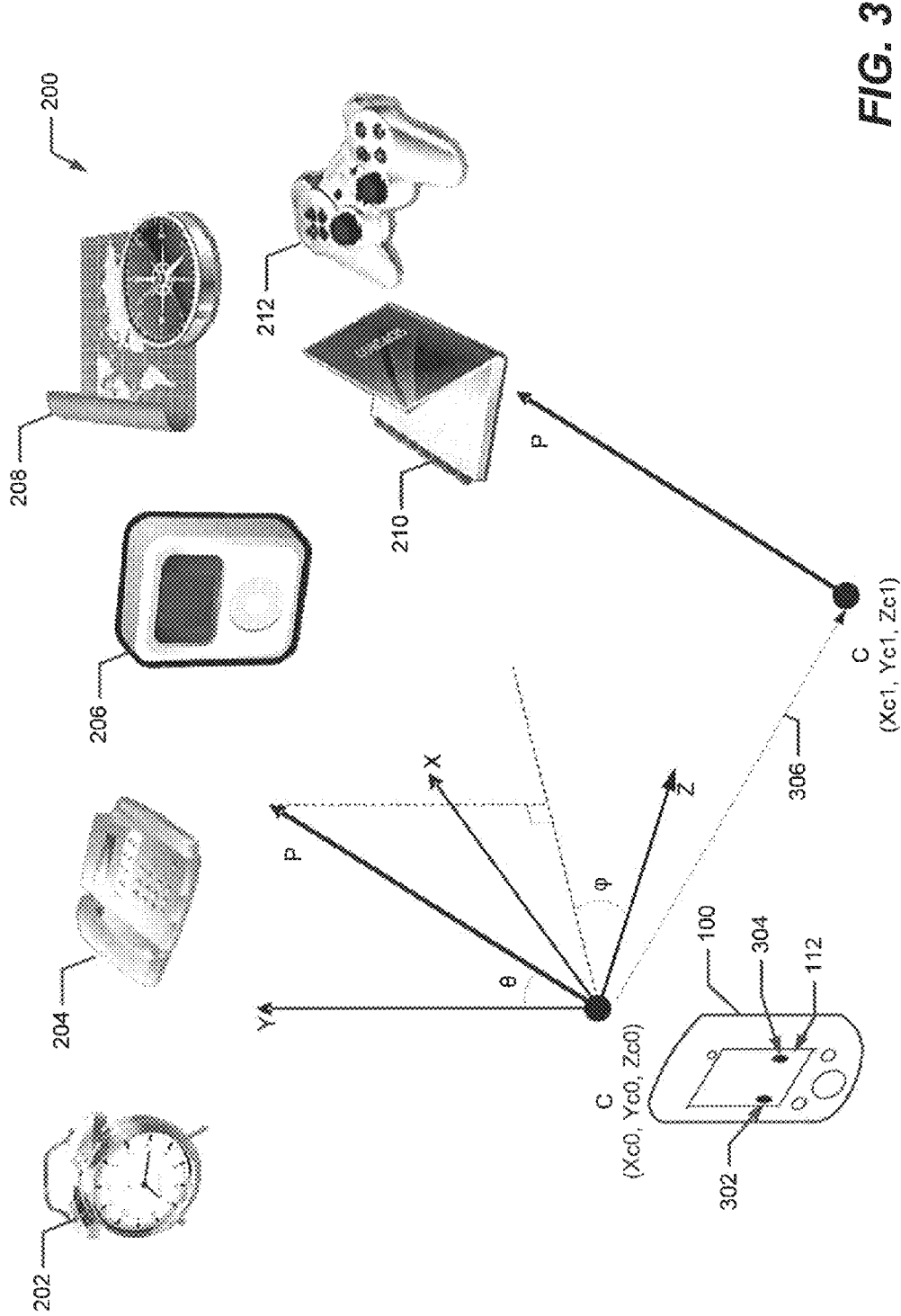
FIG. 3 illustrates a translation of a camera in response to a user input according to one embodiment.

According to further embodiments, processor 102 may apply a translation operation, a rotation operation, or a combination of a translation and rotation operations to the camera center C according to inputs from user 220. For example, as shown in FIG. 3, when user 220 slides the finger from a first location 302 to a second location 304 on touch screen 112, processor 102 applies a translation operation to the camera center C. In particular, when user 220 initially places the finger at first location 302 on touch screen 112, processor 102 places the camera center C at coordinates (Xc0, Yc0, Zc0) and orients the orientation vector P along a pre-set direction. When user 220 slides the finger from first location 302 towards second location 304 on touch screen 112, processor 102 moves the camera center C along a path 306. Path 306 corresponds to a motion of the point of contact from first location 302 to second location 304. When moving the camera center, processor 102 maintains the orientation vector P unchanged. As a result, touch screen 112 display a series of images showing 3D scene 200 when the camera center is translated along path 306.

When user 220 stops and lifts the finger at second location 304 on touch screen 112, processor 102 stops the camera center C at coordinates (Xc1, Yc1, Zc1). Again, the orientation vector P is unchanged. As a result, touch screen 112 displays an image of 3D scene 200 corresponding to the camera center C at the coordinates (Xc1, Yc1, Zc1) and the orientation vector P.

According to a further embodiment, processor 102 determines the translation of the camera center C according to the following general equations:

$$\Delta Xc = f_1(\Delta x_s, \Delta y_s), \qquad (7)$$

$$\Delta Yc = f_2(\Delta x_s, \Delta y_s), \text{ and} \qquad (8)$$

$$\Delta Zc = f_3(\Delta x_s, \Delta y_s), \qquad (9)$$

where $\Delta Xc$, $\Delta Yc$, and $\Delta Zc$ represent the translation of the camera center C along the X, Y, and Z axes, respectively, and $f_1$, $f_2$, and $f_3$ represent functional relationships between the motion of the point of contact on touch screen 112 and the translation of the camera center C. By applying different functional relationships $f_1$, $f_2$, and $f_3$, processor 102 controls how the camera center C is translated in 3D scene 200 in response to the two-dimensional motion of the point of contact on touch screen 112. The functional relationships $f_1$, $f_2$, and $f_3$ may each define a linear or nonlinear function of $\Delta x_s$ and $\Delta y_s$.

According to a further embodiment, the functional relationships $f_1$, $f_2$, and $f_3$ are linear functions of $\Delta x_s$ and $\Delta y_s$. Thus, the motion of the camera center C along path 306 is proportional to the motion of the point of contact on touch screen 112. Processor 102 determines the proportion based on a preset ratio between a dimension of 3D scene 200 and a resolution of touch screen 112.

According to a still further embodiment, only selected ones of the motion components $\Delta Xc$, $\Delta Yc$, and $\Delta Zc$ of the camera center C are adjusted according to the motion of the point of contact. For example, when the point of contact moves in a horizontal direction on touch screen 112, processor 102 translates the camera center C along a horizontal path by adjusting Zc. When the point of contact moves in a vertical direction, processor 102 translates the camera center C along a vertical path by adjusting Yc. The motion component $\Delta Xc$ is set to zero and is unaffected by the motion of the point of contact.

Figure 4:
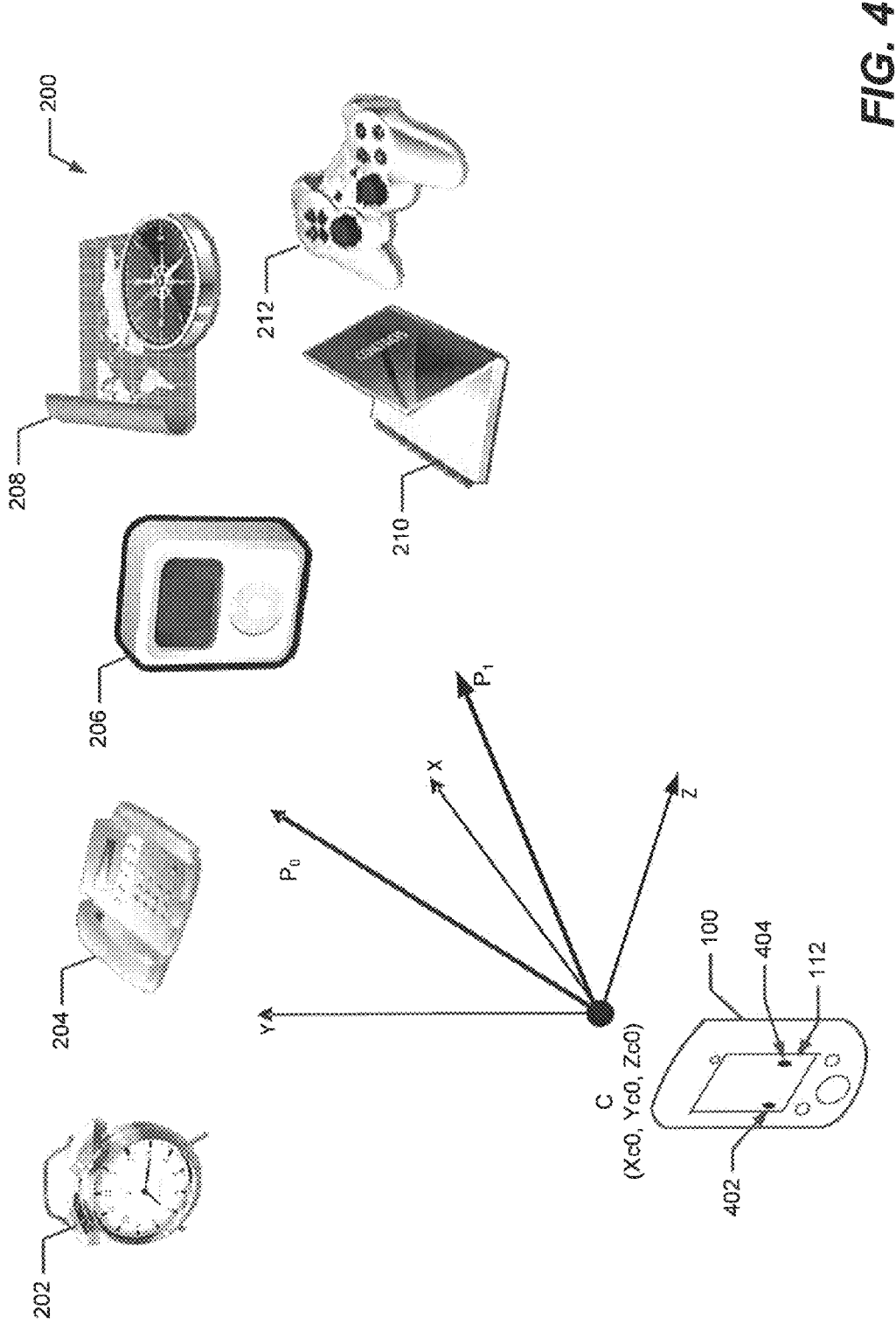
FIG. 4 illustrates a rotation of the camera in response to a user input according to another embodiment.

According to another embodiment as shown in FIG. 4, when user 220 slides the finger from a first location 402 to a second location 404 on touch screen 112, processor 102 applies a rotation operation to the camera center C. In particular, when user 220 initially places the finger at first location 402 on touch screen 112, processor 102 places the camera center C at coordinates (Xc0, Yc0, Zc0) and orients the orientation vector P along a first direction $P_0$. When user 220 slides the finger from first location 402 towards second location 404, processor 102 rotates the orientation vector P of the camera center C from the first direction $P_0$ towards a second direction $P_1$. The direction of the rotation is determined based on the direction of the motion of the point of contact. For example, when the point of contact moves in a horizontal direction, processor 102 rotates the camera center C horizontally (i.e., around the Y axis). Also, for example, when the point of contact moves in a vertical direction, processor 102 rotates the orientation vector P of the camera center C vertically (i.e., around the Z axis). Processor 102 may also rotate the orientation vector P in any other directions as user 220 desires. When rotating the orientation vector P, processor 102 maintains the location of the camera center C unchanged. As a result, touch screen 112 display a series of images showing 3D scene 200 when the orientation vector P of the camera center C is rotated.

When user 220 stops and lifts the finger at second location 404 on touch screen 112, processor 102 stops the rotation of the orientation vector P. As a result, the orientation vector P points along the second direction $P_1$. As a result, touch screen 112 displays an image of 3D scene 200 corresponding to the camera center C at the coordinates (Xc0, Yc0, Zc0) and the orientation vector P along the second direction $P_1$.

According to a further embodiment, processor 102 rotates the orientation vector P by changing the angles θ and φ (shown in FIG. 3) in response to the inputs from user 220 according to the following equations:

$$\Delta\theta = g_1(\Delta x_s, \Delta y_s) \text{ and} \tag{10}$$

$$\Delta\phi = g_2(\Delta x_s, \Delta y_s), \tag{11}$$

where Δθ and Δφ represent changes in the angles θ and φ, respectively, indicating the rotation of the orientation vector P, and $g_1$ and $g_2$ represent general functional relationships between the motion of the point of contact on touch screen 112, $\Delta x_s$ and $\Delta y_s$, and the rotation of the orientation vector P, Δθ and Δφ. By applying different functional relationships $g_1$ and $g_2$, processor 102 controls the manner in which the camera center is rotated in response to the movement of the point of contact on touch screen 112. The functional relationships $g_1$ and $g_2$ may each define a linear or nonlinear function of $\Delta x_s$ and $\Delta y_s$.

According to a further embodiment, equations (10) and (11) take the following linear forms, respectively, for determining the rotation of the orientation vector P by processor 102:

$$\Delta\theta = \Delta y_s \cdot r_y \text{ and} \tag{12}$$

$$\Delta\phi = \Delta x_s \cdot r_x, \tag{13}$$

where Δθ, Δφ, $\Delta x_s$, and $\Delta y_s$ are defined above and $r_y$ and $r_x$ represent factors for converting the motion of the point of contact on touch screen 112, $\Delta x_s$ and $\Delta y_s$, to the rotation of the orientation vector P, Δφ and Δθ. By applying the functional relationships (12) and (13), processor 102 varies the angle θ, when user 220 slides the finger along the $y_s$ axis of touch screen 112, and varies the angle φ, when user 220 slides the finger along the $x_s$ axis of touch screen 112. When the motion of the point of contact includes both $\Delta x_s$ and $\Delta y_s$ components, processor 102 adjusts the angles φ and θ simultaneously according to the functional relationships (12) and (13).

According to an alternative embodiment, equations (10) and (11) take the following nonlinear forms, respectively, for determining the rotation of the orientation vector P by processor 102:

$$\Delta\theta = (\Delta y_s)^{1/2} \cdot r_y \text{ and} \tag{14}$$

$$\Delta\phi = (\Delta x_s)^{1/2} \cdot r_x. \tag{15}$$

Functional relationships (14) and (15) provides a nonlinear transformation from the user inputs, $\Delta x_s$ and $\Delta y_s$, to the rotation of the orientation vector P. Because of the nonlinearity, functional relationships (14) and (15) provide a relatively greater sensitivity for the rotation when the user inputs are relatively small, and a relatively lower sensitivity for the rotation when the user inputs are relatively large.

According to an alternative embodiment, the factors $r_y$ and $r_x$ can instead be assigned the same value. Processor 102 may determine the value for $r_y$ and $r_x$ based on parameters of touch screen 112 and a maximum allowable rotation for the orientation vector P. In particular, the factors $r_y$ and $r_x$ may be determined according to the following formula:

$$r_y = r_x = D/N, \tag{16}$$

where N represents the number of pixels along the shorter edge of touch screen 112 and D represents the maximum rotation allowed (in degrees) corresponding to a maximum range of the user input. For example, the camera center may be rotated within a maximum range defined by D when user 220 slides the finger across entire touch screen 112 along the shorter edge. In one example, D is equal to 270 degrees. In other words, the camera is rotated by 90 degrees when the user slides the finger through ⅓ of the shorter edge of the touch screen 112.

Figure 5C:
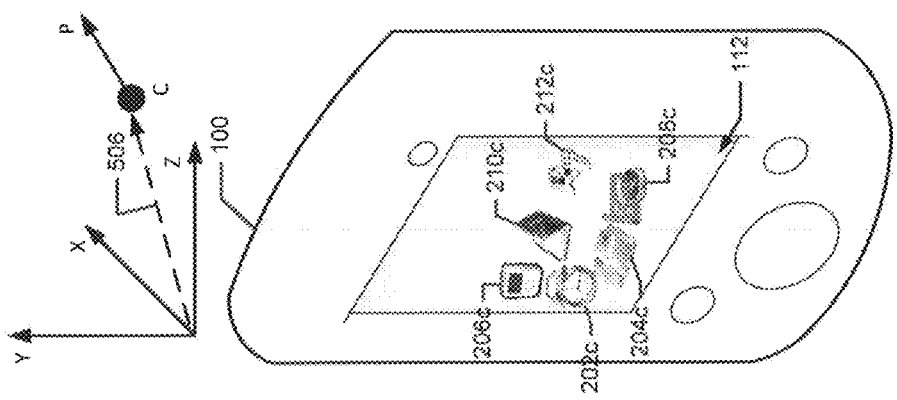
FIGS. 5A-5C illustrate a combination of translation and rotation of the camera in response to a user input according to still another embodiment.
Figure 5B:
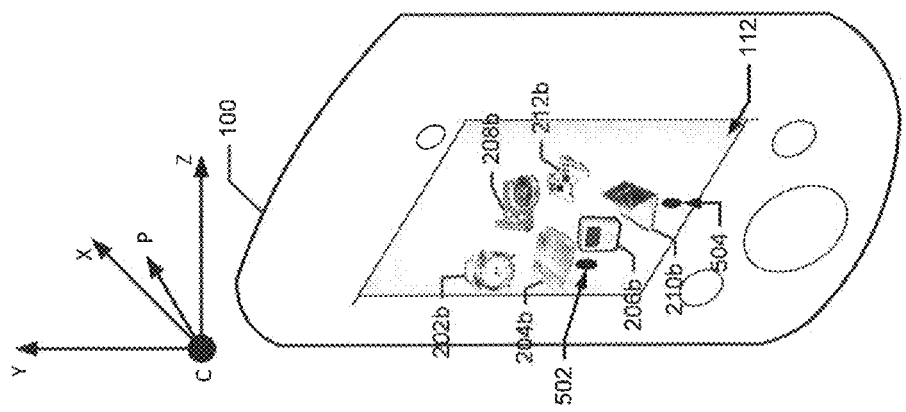
Figure 5A:
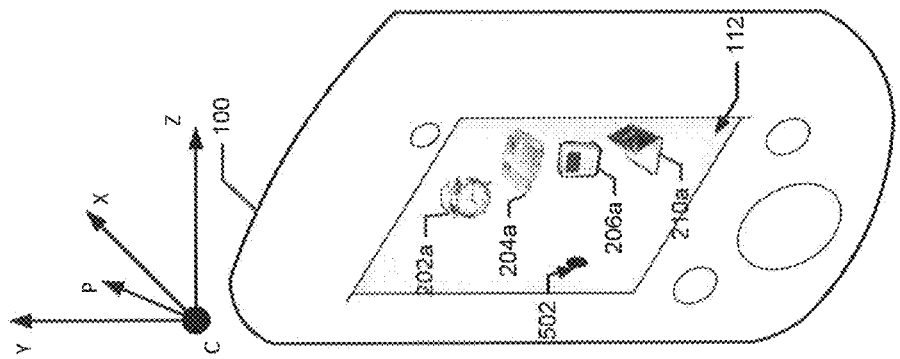

According to a still further embodiment as shown in FIGS. 5A-5C, processor 102 applies a combination of translation and rotation operations to the camera center C in response to the user inputs received through touch screen 112. When user 220 slides the finger on touch screen 112, processor 102 first applies a rotation operation to the orientation vector P of the camera center C. When user 220 lifts the finger from touch screen 112, processor 102 terminates the rotation operation and applies a translation operation to translate the camera center C to a new location so as to focus the rendering of 3D scene 200 on a newly selected graphical element.

More particularly, as shown in FIG. 5A, processor 102 initially renders an image of 3D scene 200 on touch screen 112 based on the camera center C at a pre-set location and along a pre-set orientation for the orientation vector P. Accordingly, touch screen 112 may show, for example, only images 202a, 204a, 206a, and 210a for graphical elements 202, 204, 206, and 210, respectively. The other graphical elements are occluded or cropped during the rendering of 3D scene 200.

When the user presses a finger on touch screen 112, processor 102 determines the point of contact at a first location 502 on touch screen 112. Processor 102 also determines screen coordinates ($x_{t0}$, $y_{t0}$) for first location 502 of the point of contact on touch screen 112.

In FIG. 5B, the user slides the finger from first location 502 towards a second location 504. During the operation by the user, processor 102 rotates the orientation vector P of the camera center C as described above, while maintaining the location of the camera center C unchanged. As a result, touch screen 112 displays a sequence of images of 3D scene 200 corresponding to the rotation of the camera center C. Graphical elements 202-212 are rendered on touch screen 112 as images 202b-212b consistent, respectively, with the rotation of the camera center C.

In FIG. 5C, when the user stops and lifts the finger at second location 504, processor 102 terminates the rotation of the orientation vector P and determines screen coordinates ($x_{t1}$, $y_{t1}$) for second location 504. The motion of the point of contact on touch screen 112, $\Delta x_s$ and $\Delta y_s$, required by equations (10)-(15) is determined according to the followings:

$$\Delta x_s = x_{t1} - x_{t0} \text{ and} \tag{17}$$

$$\Delta y_s = y_{t1} - y_{t0} \tag{18}.$$

Additionally, processor 102 determines screen coordinates of images of graphical elements 202-212. The screen coordinates of the images of graphical elements 202-212 are indicated respectively by coordinates ($x_{202}$, $y_{202}$), ($x_{204}$, $y_{204}$), ($x_{206}$, $y_{206}$), ($x_{208}$, $y_{208}$), ($x_{210}$, $y_{210}$), and ($x_{212}$, $y_{212}$), which may be determined by projecting 3D scene 200 to touch screen 112 based on the current location and orientation of the camera center C. Processor 102 then selects, based on the screen coordinates, a graphical element (e.g., graphical element 210) whose image (e.g., image 210b) is the closest to second location 504, where the point of contact was last detected. Processor 102 then applies a translation to the camera center C so as to render the image (e.g., image 210c) of the selected graphical element at the center of touch screen 112. Processor 102 then renders images of the other graphical elements (e.g., images 202c-208c and 212c) consistent with the current location and orientation of the camera center C.

According to a further embodiment, when two or more images of graphical elements 202-212 are at substantially equal distances to second location 504, processor 102 makes a selection from those graphical elements based on a priority list. This may occur, for example, when the two or more images of the graphical elements overlap each other during the rendering of 3D scene 200. The priority list includes pre-determined priority values assigned to graphical elements 202-212. Processor 102 selects the graphical element having the highest priority and renders the image of the selected graphical element at the center of touch screen 112.

According to a further embodiment, in translating the camera center C to a new location, processor 102 determines a path 506 for the translation operation and moves the camera center C along path 506. Processor 102 determines path 506 according to an interpolation between the original location of the camera center C before the translation and the current location of the camera center C after the translation. The interpolation may be a linear or a nonlinear interpolation as known in the art.

Figure 6:
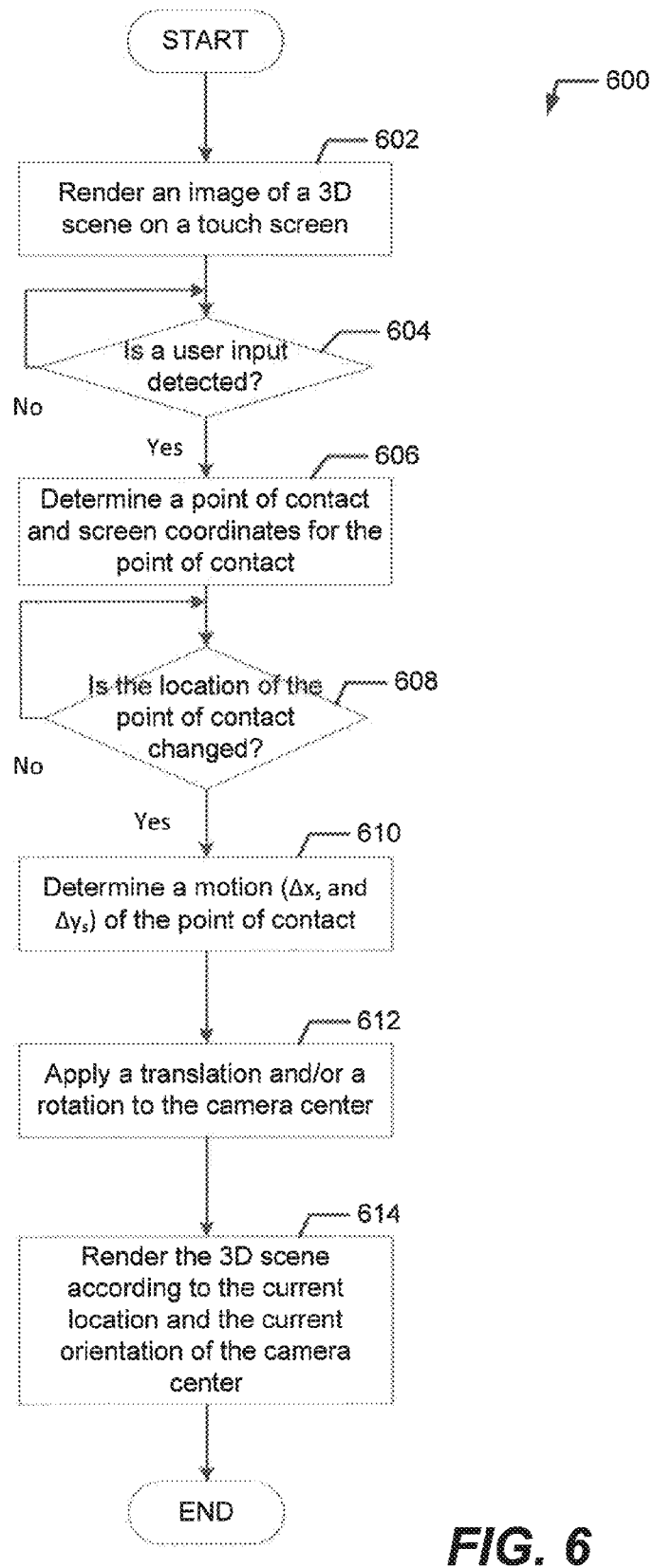
FIG. 6 illustrates a flow diagram of a process for generating a three-dimensional user interface.

FIG. 6 depicts a flow chart of a process 600 for providing a three-dimensional user interface based on a 3D scene as shown in FIG. 2. Process 600 may be implemented on any computing device and, for explanatory purposes, is described with respect to implementation on device 100. Accordingly, steps of process 600 described below are executed by processor 102 based on instructions stored in storage module 104 and in response to user inputs received from touch screen 112. The 3D scene may include a plurality of graphical elements each associated with an application stored in storage module 104.

According to process 600, at step 602, an image of the 3D scene is rendered on touch screen 112 according to a current location and a current orientation of the camera center. The current location and the current orientation of the camera center may be set to default values or based on previous user inputs.

At step 604, processor 102 of computing device 100 determines whether a user input is detected through touch screen 112. Processor 102 determines the user input when a finger of a user or any part of the user comes into contact with the touch screen. If no user input is detected ("No" at step 604), process 600 returns to step 604 to continue monitoring whether a user input is detected. If a user input is detected ("Yes" at step 604), process 600 continues to step 606.

At step 606, processor 102 determines a point of contact between touch screen 112 and the user. Processor 102 also determines a location of the point of contact represented by screen coordinates $(x_{t0}, y_{t0})$.

At step 608, processor 102 determines whether the location of the point of contact is changed in response to additional user inputs. For example, when the user slides the finger on the touch screen, the location of the point of contact is changed accordingly. If no motion is detected for the point of contact ("No" at step 608), process 600 returns to step 608 to continue monitoring the point of contact. If a change of the location of the point of contact is detected ("Yes" at step 608), process 600 continues to step 610.

At step 610, processor 102 determines a motion of the point of contact represented by motion components $\Delta x_s$ and $\Delta y_s$. More particularly, processor 102 first determines a current location of the point of contact represented by new screen coordinates $(x_{t1}, y_{t1})$. Processor 102 then determines the motion components ($\Delta x_s$ and $\Delta y_s$) of the point of contact based on formulas (17) and (18).

At step 612, processor 102 applies a translation and/or a rotation operation to the camera center according to the motion of the point of contact. Processor 102 determines the translation and the rotation as discussed above according to equations (7)-(15). In particular, processor 102 may apply the translation operation as shown in FIG. 3 according to equations (7)-(9). Processor 102 may also apply the rotation operation as shown in FIG. 4 according to general equations (10) and (11). For the rotation operation, processor 102 may use the linear forms (12) and (13) for equations (10) and (11), respectively. Alternatively, processor 102 may also use the nonlinear forms (14) and (15) for equations (10) and (11), respectively. In a still alternative embodiment, processor 102 may apply a combination of the rotation and the translation operations as shown in FIGS. 5A-5C.

At step 614, processor 102 updates the rendering of the 3D scene according to the current location and the current orientation of the camera center. The updated rendering provides a view of the 3D scene that is consistent with the translation and the rotation of the camera center. Processor 102 may further render a sequence of images of the 3D scene, while the camera center is translated and/or rotated.

It will be appreciated that the present disclosure is not limited to the exact construction that has been described above and illustrated in the accompanying drawings, and that various modifications and changes can be made without departing from the scope thereof. For example, although the 3D interface is discussed in the context of a handheld device having a touch screen, the embodiments disclosed herein may be implemented on any computer system having a keyboard, a mouse, or a touchpad. It is intended that the scope of the disclosure only be limited by the appended claims.

What is claimed is:

1. A method for providing a three-dimensional user interface, including:
  generating an image of a three-dimensional scene according to a set of camera parameters, the three-dimensional scene including a plurality of three-dimensional graphical elements, the three-dimensional graphical elements being associated with a plurality of applications stored on a computing device, wherein the computing device includes a touch screen, and the camera parameters include a location and an orientation of a camera center;
  receiving a user input, wherein the user input indicates a point of contact between a user and the touch screen;
  determining a motion of the point of contact from a first location on the touch screen to a second location on the touch screen;
  determining a first set of screen coordinates for the first location on the touch screen and a second set of screen coordinates for the second location on the touch screen, the first set of screen coordinates and the second set of screen coordinates each being defined with respect to a screen coordinate system associated with the touch screen;

determining one or more changes between the first set of screen coordinates and the second set of screen coordinates;

applying a rotation operation to the orientation of the camera center based on a direction of the motion of the point of contact, wherein the rotation operation applied to the orientation of the camera has a nonlinear relationship with the one or more changes between the first set of screen coordinates and the second set of screen coordinates;

adjusting the location of the camera center based on the first set of screen coordinates and the second set of screen coordinates, wherein the adjustment to the location of the camera is proportional to the one or more changes between the first set of screen coordinates and the second set of screen coordinates and is determined based on a preset ratio between a dimension of the three-dimensional scene and a resolution of the touch screen; and updating the image of the three-dimensional scene according to the rotated orientation of the camera center and the adjusted location of the camera center.

2. The method of claim 1, further comprising associating a theme to the three-dimensional scene.

3. The method of claim 1, wherein the method further comprises displaying the image of the three-dimensional scene on the touch screen.

4. The method of claim 1, further comprising determining the rotation based on a multiplication of a factor and the motion of the point of contact.

5. The method of claim 4, further comprising determining the factor based on a screen resolution of the touch screen and a maximum allowable rotation for the camera center, the maximum allowable rotation corresponding to a maximum range of the user input.

6. The method of claim 1, further comprising:
generating images of the graphical elements according to the adjusted location and the rotated orientation of the camera center;
receiving another user input, wherein the another user input indicates another point of contact between the user and the touch screen;
selecting one of the graphical elements in response to the another user input; and
displaying the image of the selected graphical element at a center of the touch screen.

7. The method of claim 6, wherein the selecting of one of the graphical elements further comprises:
determining screen coordinates for the images of the graphical elements; and
selecting one of the graphical elements by comparing the screen coordinates of the images of the graphical elements and the screen coordinates of the another point of contact.

8. The method of claim 7, wherein the selecting of one of the graphical elements further comprises selecting the graphical element having an image closer to the another point of contact than the images of the other graphical elements.

9. The method of claim 7, further comprising selecting one of the graphical elements according to a priority list when two or more images of the graphical elements are at equal distances from the another point of contact.

10. An apparatus for providing a three-dimensional user interface, comprising:
a touch screen including:
an input module for receiving a user input, wherein the user input indicates a point of contact between a user and the touch screen; and
an output module for displaying an image of a three-dimensional scene;
a storage module for storing computer-executable instructions and a plurality of applications; and
a processor for executing the computer-executable instructions, the computer-executable instructions causing the processor to:
generate the image of the three-dimensional scene according to a set of camera parameters, the three-dimensional scene including a plurality of three-dimensional graphical elements, the three-dimensional graphical elements being associated with the applications stored in the storage medium, wherein the camera parameters include a location and an orientation of a camera center;
determine a motion of the point of contact from a first location on the touch screen to a second location on the touch screen;
determine a first set of screen coordinates for the first location on the touch screen and a second set of screen coordinates for the second location on the touch screen, the first set of screen coordinates and the second set of screen coordinates each being defined with respect to a screen coordinate system associated with the touch screen;
determine one or more changes between the first set of screen coordinates and the second set of screen coordinates;
apply a rotation operation to the orientation of the camera center based on a direction of the motion of the point of contact, wherein the rotation operation applied to the orientation of the camera has a nonlinear relationship with the one or more changes between the first set of screen coordinates and the second set of screen coordinates;
adjust the location of the camera center based on the first set of screen coordinates and the second set of screen coordinates, wherein the adjustment to the location of the camera is proportional to the one or more changes between the first set of screen coordinates and the second set of screen coordinates and is determined based on a preset ratio between a dimension of the three-dimensional scene and a resolution of the touch screen; and
update the image of the three-dimensional scene according to the rotated orientation of the camera center and the adjusted location of the camera center.

11. The apparatus of claim 10, wherein the apparatus is a handheld device.

12. A computer-readable medium including instructions, which, when executed by a processor, cause the processor to perform a method for providing a three-dimensional user interface, the method comprising:
generating an image of a three-dimensional scene according to a set of camera parameters, the three-dimensional scene including a plurality of three-dimensional graphical elements, the three-dimensional graphical elements being associated with a plurality of applications stored on a computing device, wherein the computing device includes a touch screen, and the camera parameters include a location and an orientation of a camera center;

receiving a user input, wherein the user input indicates a point of contact between a user and the touch screen;

determining a motion of the point of contact from a first location on the touch screen to a second location on the touch screen;

determining a first set of screen coordinates for the first location on the touch screen and a second set of screen coordinates for the second location on the touch screen, the first set of screen coordinates and the second set of screen coordinates each being defined with respect to a screen coordinate system associated with the touch screen;

determining one or more changes between the first set of screen coordinates and the second set of screen coordinates;

applying a rotation operation to the orientation of the camera center based on a direction of the motion of the point of contact, wherein the rotation operation applied to the orientation of the camera has a nonlinear relationship with the one or more changes between the first set of screen coordinates and the second set of screen coordinates;

adjusting the location of the camera center based on the first set of screen coordinates and the second set of screen coordinates, wherein the adjustment to the location of the camera is proportional to the one or more changes between the first set of screen coordinates and the second set of screen coordinates and is determined based on a preset ratio between a dimension of the three-dimensional scene and a resolution of the touch screen; and updating the image of the three-dimensional scene according to the rotated orientation of the camera center and the adjusted location of the camera center.

* * * * *